United States Patent
Nugent

(10) Patent No.: US 7,284,348 B1
(45) Date of Patent: Oct. 23, 2007

(54) SOLID CORE FISHING LURE

(76) Inventor: James F. Nugent, 747 Alt Blvd., Grand Island, NY (US) 14072

( * ) Notice: Subject to any disclaimer, the term of this patent is extended or adjusted under 35 U.S.C. 154(b) by 0 days.

(21) Appl. No.: 11/450,218

(22) Filed: Jun. 9, 2006

(51) Int. Cl.
A01K 85/02 (2006.01)
A01K 85/10 (2006.01)
A01K 85/00 (2006.01)

(52) U.S. Cl. .................. 43/42.1; 43/42.19; 43/42.24
(58) Field of Classification Search ............ 43/42.1, 43/42.19, 42.11, 42.15, 42.16, 42.17, 42.18, 43/42.41, 42.4, 42.45, 42.24
See application file for complete search history.

(56) References Cited

U.S. PATENT DOCUMENTS

| | | | | |
|---|---|---|---|---|
| 779,744 | A * | 1/1905 | Shakespeare, Jr. | 43/42.1 |
| 890,549 | A * | 6/1908 | Zamel | 43/42.1 |
| 934,087 | A * | 9/1909 | Moran | 43/42.1 |
| 981,454 | A * | 1/1911 | Miller et al. | 43/42.1 |
| 1,154,168 | A * | 9/1915 | Bosserman | 43/42.1 |
| 1,419,903 | A * | 6/1922 | Bailey | 43/42.1 |
| 1,508,111 | A * | 9/1924 | Meyer | 43/42.1 |
| 1,689,027 | A * | 10/1928 | Helle | 43/42.1 |
| 1,948,983 | A * | 2/1934 | Danielesuk | 43/42.1 |
| 1,993,018 | A * | 9/1935 | Pfeifle | 43/42.1 |
| 2,136,713 | A * | 11/1938 | Schnabel | 43/42.1 |
| 2,191,244 | A * | 2/1940 | Wise | 43/42.1 |
| 2,228,591 | A * | 1/1941 | Brown | 43/42.28 |
| 2,332,400 | A * | 10/1943 | Richardson | 43/42.1 |
| 2,365,502 | A * | 12/1944 | Weesner | 43/42.28 |
| 2,518,487 | A * | 8/1950 | Metz | 43/42.28 |
| 2,590,461 | A * | 3/1952 | Rasch | 43/42.1 |
| 2,600,673 | A * | 6/1952 | Murray | 43/42.1 |
| 2,686,382 | A * | 8/1954 | Fisher | 43/42.28 |
| 2,700,842 | A * | 2/1955 | Lehmann | 43/35 |
| 2,741,057 | A * | 4/1956 | Morris et al. | 43/42.15 |
| 2,741,864 | A * | 4/1956 | Morris et al. | 43/44.9 |
| 2,745,206 | A * | 5/1956 | Wilson | 43/42.06 |
| 2,750,702 | A * | 6/1956 | Hartig | 43/42.17 |
| 2,796,695 | A * | 6/1957 | Meulnart | 43/42.19 |
| 2,820,314 | A * | 1/1958 | Scott | 43/42.1 |
| 3,003,276 | A * | 10/1961 | Patterson | 43/42.17 |
| 3,012,358 | A * | 12/1961 | Multanen | 43/42.28 |
| 3,060,620 | A * | 10/1962 | Binkowski | 43/42.24 |
| 3,151,413 | A * | 10/1964 | Witz | 43/42.1 |
| 3,343,296 | A * | 9/1967 | Davis | 43/42.28 |
| 3,389,490 | A * | 6/1968 | Peters et al. | 43/42.1 |
| 3,688,430 | A * | 9/1972 | Balch | 43/42.1 |
| 3,722,128 | A * | 3/1973 | Tremblay | 43/42.1 |
| 3,987,576 | A * | 10/1976 | Strader | 43/42.16 |
| 3,990,171 | A * | 11/1976 | Davis | 43/42.17 |
| 4,016,671 | A * | 4/1977 | Larsen | 43/42.17 |
| 4,090,319 | A * | 5/1978 | Wolfe | 43/42.19 |
| 4,163,338 | A * | 8/1979 | Lucarini | 43/42.17 |
| 4,208,824 | A * | 6/1980 | Maxwell | 43/42.19 |
| 4,266,360 | A * | 5/1981 | Smith | 43/42.09 |
| 4,628,629 | A * | 12/1986 | Rocchietta et al. | 43/42.19 |

(Continued)

Primary Examiner—Darren W. Ark

(57) ABSTRACT

A solid core fishing lure capable of causing a higher degree of disturbance in water is constructed of a generally spherical solid body, a metal shaft through the body, at least two hooks emanating from the metal shaft conforming substantially to the generally spherical body, at least one skirt tail mounted to and projecting away from a rear portion of the spherical body, two eye-like emblems positioned on a front portion of the spherical body, and an attachment means for a fishing line connecting to the metal shaft at the front portion of the spherical body.

8 Claims, 3 Drawing Sheets

U.S. PATENT DOCUMENTS

| | | | | |
|---|---|---|---|---|
| 4,693,028 A | * | 9/1987 | Hill | 43/4.5 |
| 4,730,410 A | * | 3/1988 | Sobieniak | 43/42.19 |
| 4,744,167 A | * | 5/1988 | Steele | 43/42.1 |
| 4,817,325 A | * | 4/1989 | Thomas | 43/42.1 |
| 4,888,909 A | * | 12/1989 | Adams | 43/42.16 |
| 4,893,431 A | * | 1/1990 | Ehlers | 43/42.47 |
| 4,914,851 A | * | 4/1990 | Acker | 43/42.41 |
| 4,922,645 A | * | 5/1990 | Hannon et al. | 43/42.4 |
| 4,998,371 A | * | 3/1991 | Driesel | 43/42.16 |
| 5,038,512 A | * | 8/1991 | Gaal | 43/42.19 |
| 5,113,606 A | * | 5/1992 | Rinker | 43/42.19 |
| 5,299,378 A | * | 4/1994 | Ballard | 43/42.1 |
| 5,327,671 A | * | 7/1994 | Rosek | 43/42.17 |
| 5,412,900 A | * | 5/1995 | Rosek | 43/42.19 |
| 5,428,917 A | * | 7/1995 | Cunningham | 43/42.19 |
| D373,810 S | * | 9/1996 | Waller | D22/128 |
| 5,595,015 A | * | 1/1997 | Jensen | 43/42.19 |
| 5,678,350 A | * | 10/1997 | Moore | 43/42.15 |
| 5,953,848 A | * | 9/1999 | Darnell et al. | 43/42.19 |
| 5,956,887 A | * | 9/1999 | Mostovsky | 43/42.19 |
| 6,105,303 A | * | 8/2000 | Hall, Sr. | 43/42.41 |
| H1865 H | * | 10/2000 | Aoki | 43/42.13 |
| 6,131,329 A | * | 10/2000 | Kageyama | 43/42.33 |
| 6,192,616 B1 | * | 2/2001 | Kent | 43/42.24 |
| 6,519,894 B1 | * | 2/2003 | Geary | 43/42.1 |
| 6,598,336 B2 | * | 7/2003 | Link | 43/42.28 |
| 6,840,001 B1 | * | 1/2005 | Cox | 43/42.19 |
| 2001/0047608 A1 | * | 12/2001 | Cox | 43/42.19 |
| 2002/0178643 A1 | * | 12/2002 | Brodeur | 43/42 |
| 2006/0201050 A1 | * | 9/2006 | Troutman | 43/42.19 |

* cited by examiner

SOLID CORE FISHING LURE

FIELD OF THE INVENTION

The present invention generally relates to a fishing lure and more particularly, relates to a fishing lure that is constructed of a solid core spherical ball for causing a higher degree of splash when jerked in the water and thereby attracting fish to bite.

BACKGROUND OF THE INVENTION

Fishing lures of various designs have been available in the sporting goods store for many years. Generally, fishing lures are designed with bright color attached with a feather or a skirt tail for causing disturbance in water when dragged to attract the attention of fish. Most of the fishing lures are designed with a hollow cord construction for easier manufacturing at lower cost. These type of fishing lures, even though painted with a bright color and equipped with fins or skirt tails that flutter in water to attract the attention of fish, however, the lightweight lure itself does not cause a large degree of splash in the water when it is pulled or jerked as most fishermen do during fishing.

It is therefore an object of the present invention to provide a fishing lure that does not have the drawbacks or shortcomings of the conventional fishing lures.

It is another object of the present invention to provide a fishing lure that would cause a higher degree of splash when jerked in the water in order to attract the attention of fish.

It is still another object of the present invention to provide a fishing lure that is constructed of a solid-core spherical body capable of causing a higher degree of splash in water when jerked by a fisherman.

It is yet another object of the present invention to provide a fishing lure that is constructed of a solid core spherical body and equipped with at least one skirt tail painted in a bright color to attract the attention of fish.

SUMMARY OF THE INVENTION

In accordance with the present invention, a fishing lure that is constructed of a solid core spherical body and equipped with at least one skirt tail painted in a bright color is provided. The solid core spherical body of the fishing lure would cause a higher degree of splash in water when jerked in water by a fisherman, while the bright color skirt tail flutters in water to further attract the attention of fish.

The present invention fishing lure is constructed of a generally spherical solid body that has a front portion and a rear portion, a metal shaft going through the spherical body connecting the front portion and the rear portion, at least two hook emanating from the metal shaft at the rear portion conforming substantially to the generally spherically solid body, at least one skirt tail mounted to and projecting away from the rear portion of the spherical body, two eye-like emblems positioned on the front portion of the spherical body, and an attachment means for a fishing line connecting to the metal shaft at the front portion of the spherical body.

BRIEF DESCRIPTION OF THE DRAWINGS

The invention will now be described, by way of example, with reference to the accompanying drawings, in which.

DETAILED DESCRIPTION OF THE PREFERRED AND ALTERNATE EMBODIMENT

The present invention discloses a fishing lure constructed of a solid core spherical body for causing a higher degree of disturbance in water when jerked by a fisherman in order to attract the attention of a fish and causing it to bite.

The present invention solid core fishing lure includes a spherical, flexible latex rubber ball that is equipped with at least one latex skirt tail at a rear portion and artificial eyes and mouth at a front portion of the ball. At least two impaling members or hooks that are circumferentially spaced apart at the rear of the lure body. The fishing lure can be attached to a fishing line through a series of swivels and beads that provide weight to the lure. The present invention fishing lure can be supplied in small, medium and large sizes, and in different color combinations for the body and the tail.

The present invention, fishing lure can be effectively utilized for fishing by fishermen along the shoreline at the top of the water by jerking the lure about a foot at a time. The lure is capable of making disturbance and is highly visible in the water to attract larger fish and to draw more strikes.

The present invention, fishing lure may be painted of a variety of colors. For instance, the sold core latex ball can be painted in a florescent green, flat red, dark green, bright yellow, silver gray, white and black color; while the latex skirt tails can be painted green-white, red-white, green-white, green-white, red-white, red-white, and red-white, respectively.

Figure 1:
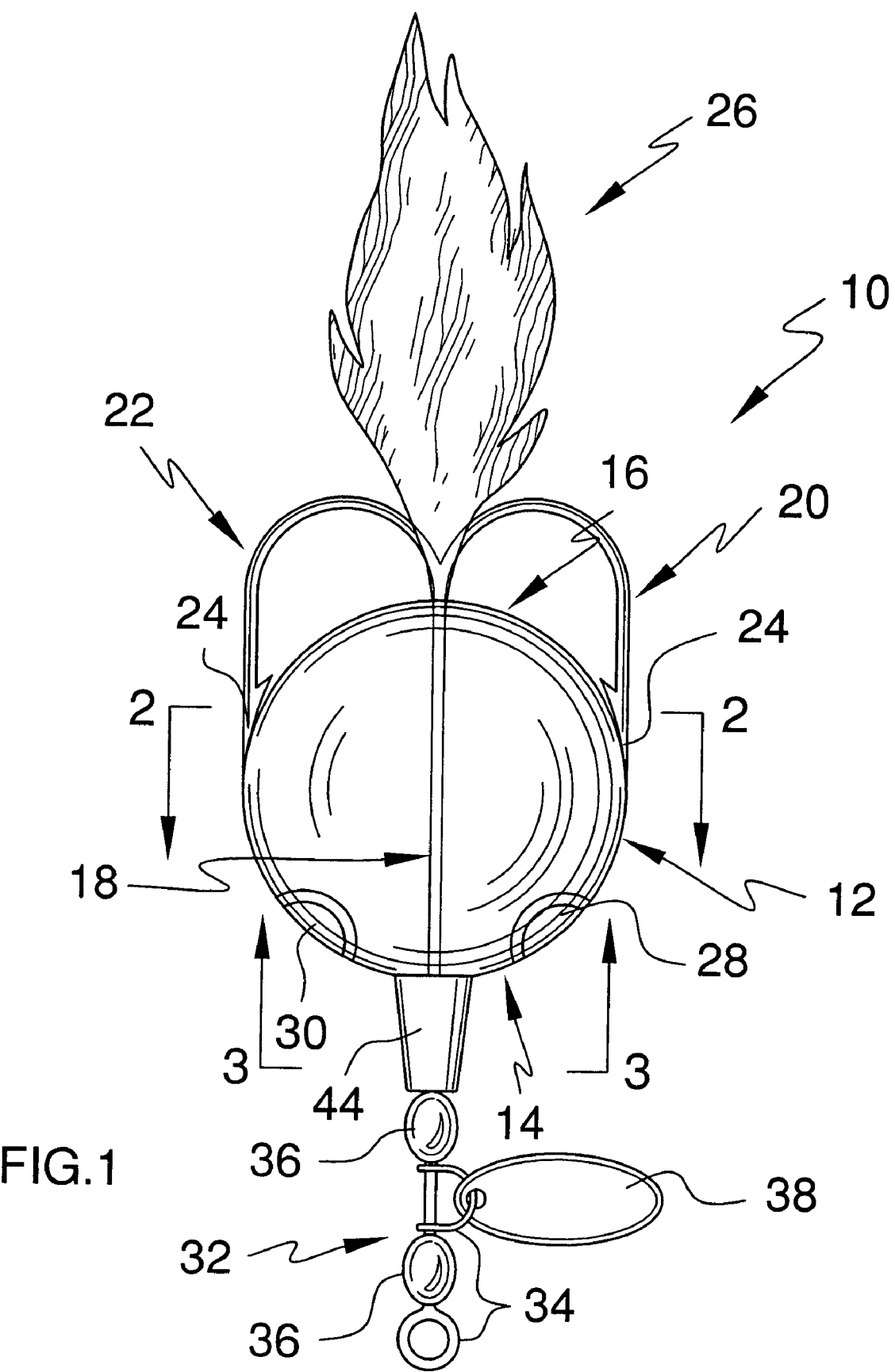
FIG. 1 is a plain view of the present invention fishing lure constructed of a solid core spherical body and at least one skirt tail.

Referring now to FIG. 1, wherein a plain view of the present invention, solid core fishing lure 10 is shown. The solid core fishing lure 10 is constructed of a generally spherical solid body 12 that has a front portion 14 and a rear portion 16, A metal shaft 18 through the spherical body 12 connecting the front portion 14 and the rear portion 16. At least two hooks 20, 22 emanating from the metal shaft 18 at the rear portion 16 of the spherical body 12. The two hooks 20, 22, are impaling members conform substantially to the generally spherical body. The spherical body 12 has a diameter of at least 1 cm. The present invention, fishing lure 10 further includes at least one skirt tail 26 mounted to and projecting away from the rear portion 16 of the spherical body 12. At least two eye like emblems 28, 30 are positioned on the front portion 14 of the spherical body 12 to make the spherical body 12 appear more live-like. An attachment means 32 for a fishing line (not shown) connects to the metal shaft 18 at the front portion 14 of the spherical body 12. As shown in FIG. 1, the attachment means includes a number of swivels 34 and a number of weights 36. The embodiment shown in FIG. 1 further shows the inclusion of tag 38 that flickers when the fishing lure 10 is jerked or pulled by a fisherman. The tag 38 therefore further attracts attention of a fish.

Figure 2:
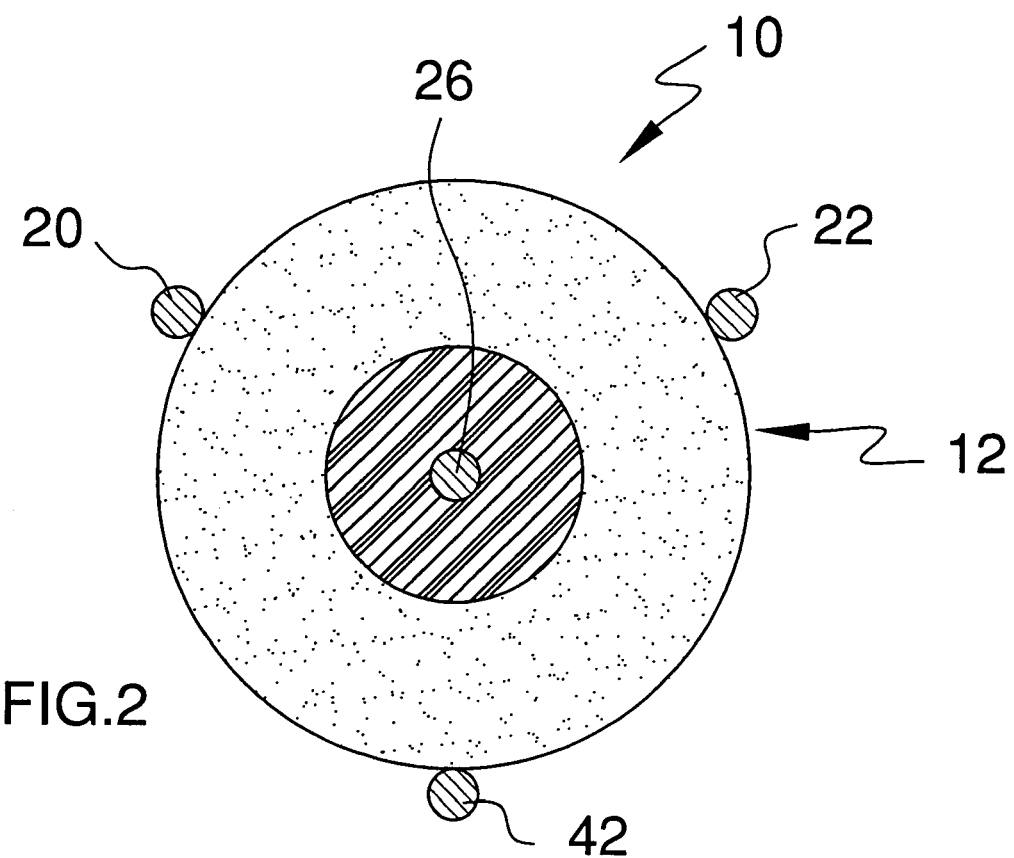
FIG. 2 is a top view of the rear portion of the solid core spherical body fishing lure.

FIG. 2 is a plain view of the rear portion 16 of the present invention, fishing lure 10. It should be noted that in this preferred embodiment, 3 impaling members or hooks 20, 22, and 42 are provided for the fishing lure 10. In some other applications, two impaling members or hooks that are spaced 180° apart circumferentially may only be necessary.

In the embodiment shown in FIG. 2, the three impaling members, 20, 22 and 42 are each spaced apart 120° circumferentially.

Figure 3:
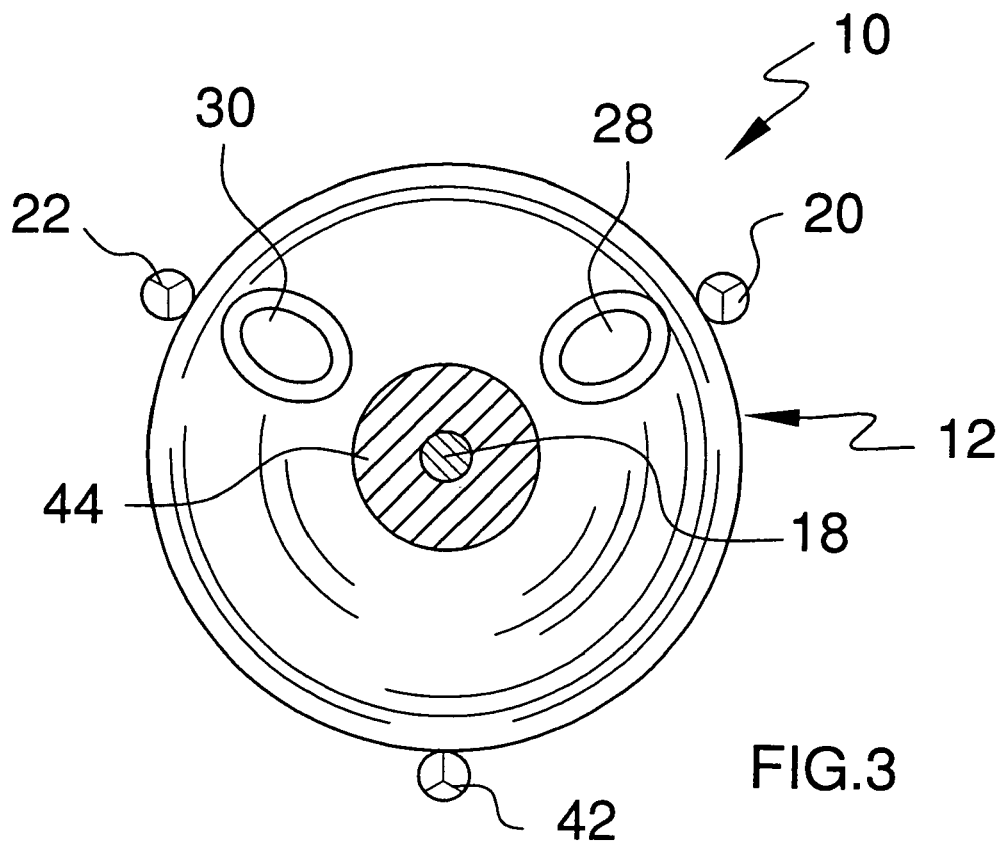
FIG. 3 is a top view of the front portion of the solid core spherical body fishing lure.

A plain view of the front portion 14 of the present invention, fishing lure 10 is shown in FIG. 3. A frustoconically shaped anchor 44 is also shown in FIG. 3 for anchoring the metal shaft 18 and for connecting to the swivels 34 and the weights 36. The two eye-like emblems 28, 30 further provide a live-like feature to the fishing lure 10 such that, in combination with the fluttering skirt tail 26, makes the fishing lure 10 appear to be a live animal, such as a small fish.

Figure 4:
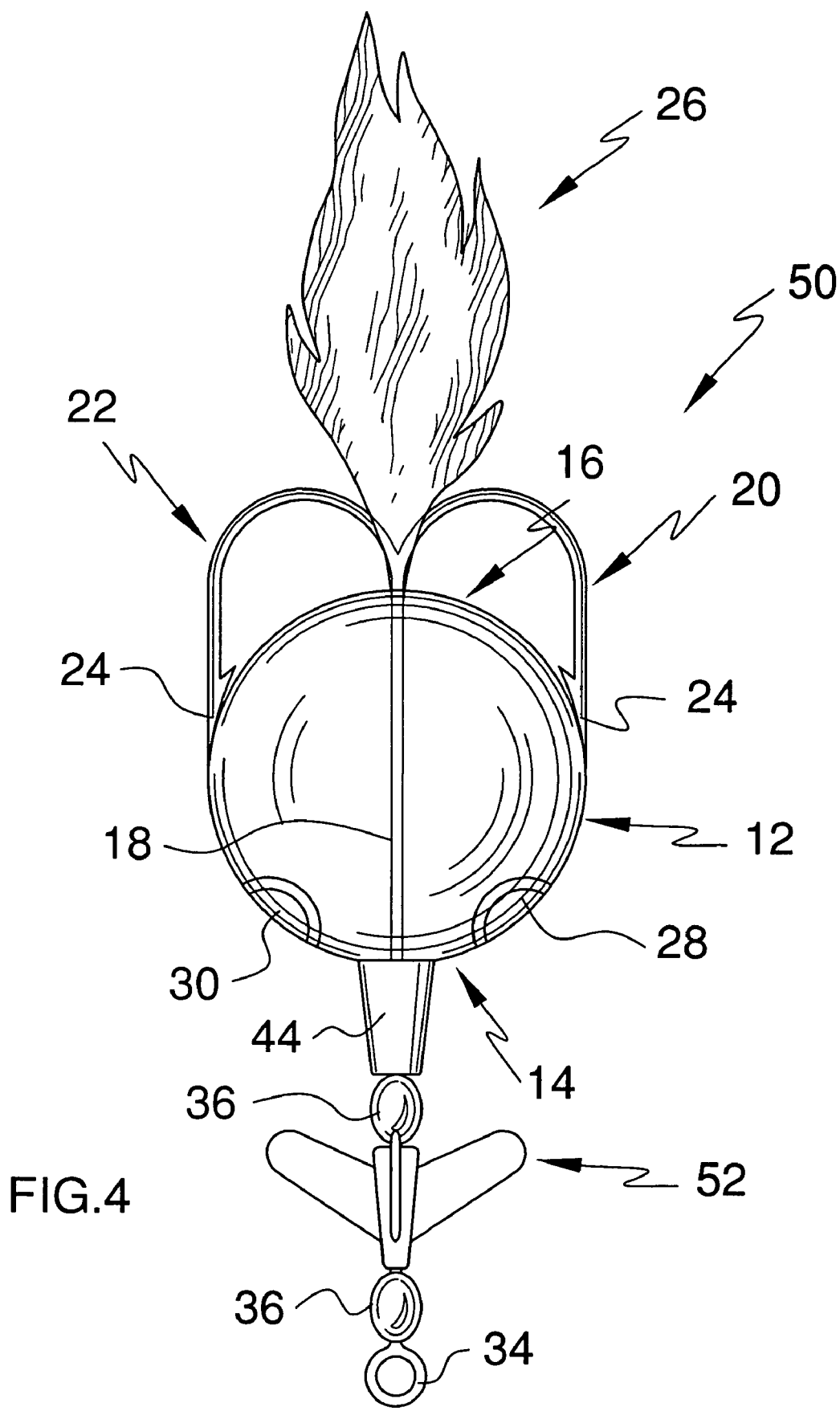
FIG. 4 is a plain view of an alternate embodiment of the present invention solid core spherical body fishing lure.

In an alternate embodiment shown in FIG. 4, the present invention, fishing lure 50 is shown with an additional flipper attachment 52. The flipper attachment 52, mounted in between two weights 36, flickers left and right vigorously when the fishing line (not shown) is jerked or pulled by the fisherman and thus making the fishing lure 50 even more like a live bait.

In the embodiment shown in FIGS. 1 and 4, it is recommended that the eye-like emblems 28, 30 to be painted black in the center portion and red-orange in the ring portion surrounding the center portion such that the fishing lure 10 looks more live-like. One popular color combination for painting the present invention fishing lure 10, 50 is florescent green for the spherical body 12 and green-white for the skirt tails 26. Another popular color combination is flat red for the spherical body 12 and red-white for the skirt tails 26. Still another popular color combination is dark green for the spherical body 12 and green-white for the skirt tails 26.

While the preferred embodiment of the invention have been described above, it will be recognized and understood that various modifications can be made in the invention and the appended claims are intended to cover all such modifications which may fall within the spirit and scope of the invention.

What is claimed is:

1. A solid core fishing lure for causing disturbance in a body of water to attract fish comprising:

a generally spherical body which is solid in its entirety having a front portion and a rear portion;

a metal shaft extending through said body connecting said front portion and said rear portion;

at least two hooks, extending from said metal shaft at said rear portion conforming substantially to said generally spherical body;

at least one skirt tail mounted to and projecting away from said rear portion of said spherical body;

two eye-like emblems positioned on said front portion of said spherical body, each of said emblems are painted in black color surrounded by a red-orange ring;

attachment means for attaching a fishing line to said metal shaft extending through said front portion of the spherical body, said attachment means including at least one weight on said metal shaft;

a frustoconical shaped anchor mounted on said metal shaft between said front portion of the spherical body and the at least one weight; and flickering means for attracting the attention of a fish which moves relative to the shaft during retrieval of the lure in water, said flickering means mounted to said shaft in front of the at least one weight.

2. The solid core fishing lure for causing disturbance in a body of water according to claim 1, wherein said generally spherical solid body is formed of a polymeric material.

3. The solid core fishing lure for causing disturbance in a body of water according to claim 1, wherein said generally spherical solid body is formed of a latex rubber.

4. The solid core fishing lure for causing disturbance in a body of water according to claim 1, wherein said generally spherical solid body having a diameter of at least one centimeter.

5. The solid core fishing lure for causing disturbance in a body of water according to claim 1, wherein said at least two hooks comprise three hooks that are spaced apart circumferentially at about 120° from each other.

6. The solid core fishing lure for causing disturbance in a body of water according to claim 1, wherein said at least one skirt tail is formed of latex rubber.

7. The solid core fishing lure for causing disturbance in a body of water according to claim 1, wherein said at least one skirt tail is formed for a color combination of green-white or red-white.

8. The solid core fishing lure for causing disturbance in water according to claim 1, wherein said attachment means includes at least one swivel.

* * * * *